Feb. 20, 1951  A. D. HOBBS  2,542,524
BAND SAW WORK GUIDING ATTACHMENT
Filed Nov. 28, 1949

Arthur D. Hobbs
INVENTOR.

UNITED STATES PATENT OFFICE 2,542,524

BAND SAW WORK GUIDING ATTACHMENT

Arthur D. Hobbs, Marietta, Ga., assignor to George E. Knott, Marietta, Ga.

Application November 28, 1949, Serial No. 129,827

1 Claim. (Cl. 143—157)

This invention relates to new and useful improvements and structural refinements in band saws, and the principal object of the invention is to facilitate convenient and efficient guiding of work in engagement with the endless cutting blade of the saw.

This object is achieved by the provision of the instant device which, in the nature of an attachment, may be installed upon a conventional band saw, an important feature of the invention residing in the provision of a spring-pressed, rotatable roller having a sharp peripheral edge adapted to engage the work so as to stabilize and guide the latter while cutting.

Some of the advantages of the invention reside in its simplicity of construction, in its convenient and efficient operation as aforesaid, and in its adaptability for use on band saws of different sizes and types.

With the above more important objects and features in view and such other objects and features as may become apparent as the specification proceeds, the invention consists essentially of the arrangement and construction of parts as illustrated in the accompanying drawings, in which.

Like characters of reference are employed to designate like parts in the specification and throughout the several views.

Figure 1:
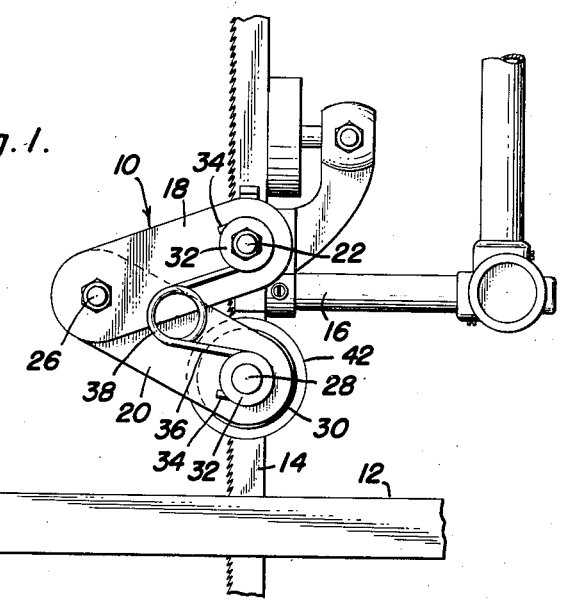
Figure 1 is a fragmentary side elevational view of a band saw showing the invention in situ thereon.

Referring now to the accompanying drawings in detail, the invention consists of a work guiding attachment designated generally by the reference character 10, which is intended for use in combination with a conventional band saw including a table 12, an endless cutting blade 14 running through the table, and a blade guide 16 which is spaced above the table adjacent the blade 14, as will be clearly apparent.

The attachment 10 embodies in its construction a supporting member consisting of a pair of straps or links 18, 20, the former being rigidly secured by a screw 22 to a lateral projection or extension 24 provided on the blade guide 16, as will be clearly apparent.

The link or strap 20 is pivotally connected to the link or strap 18 as at 26, while the free end portion of the link 20 carries a stud or screw 28 on which is mounted a rotatable work-engaging roller 30.

Figure 2:
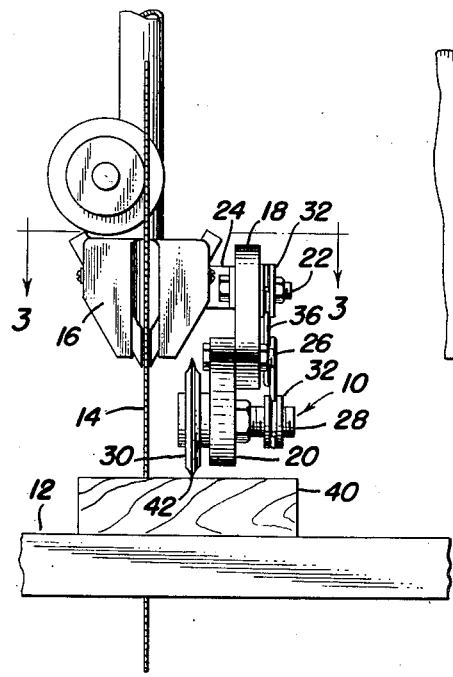
Figure 2 is a fragmentary front elevational view of the subject shown in Figure 1.
Figure 3:
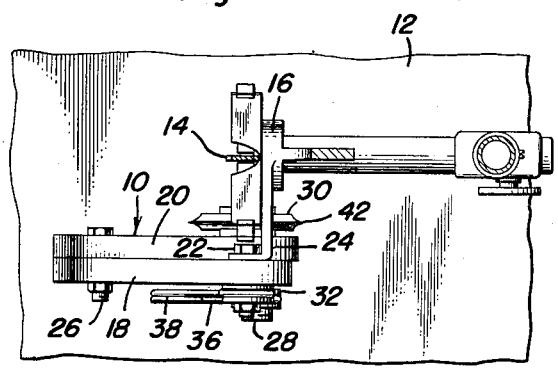
Figure 3 is a horizontal sectional detail, taken substantially in the plane of the line 3—3 in Figure 2.

It will be apparent from the foregoing that the link 20 is swingable in a vertical plane about the axis of the pivot 26, and it is to be noted that a grooved washer or keeper 32 is provided on each of the studs or screws 22, 28 so as to afford a seat for a hook-shaped extremity 34 provided at each end of a spring 36. An intermediate portion of this spring is coiled as at 38 for urging the end portions 34 apart, whereby the link 20 together with the associated roller 30 are urged downwardly against a piece of work 40 positioned on the table 12. It is also to be observed that the disk or roller 30 is sharpened at both sides so as to provide a sharp peripheral work-engaging edge 42, best illustrated in Figures 2 and 3.

When the invention is placed in use and the work 40 is positioned on the table 12 for engagement with the cutting blade 14, the roller 30, which is spaced laterally from the cutting blade, will engage the work by its sharpened edge 42, so that the work, being engaged at two points, namely, by the cutting blade and by the roller spaced away from the blade, will be effectively guided to assure performance of the cutting action in a straight line.

If the work is of a substantially soft character, such as for example, wood or the like, the pressure exerted by the spring 36 may be sufficient to embed the sharp edge 42 of the roller 30 into the work to a slight extent, which feature will be found of advantage in instances where a curvilinear cut is to be made in cutting a given number of pieces of work to the same, predetermined configuration. Under such circumstances the edge 42 of the roller 30 will form a shallow groove in the first piece of work being cut, which piece may then be used in the nature of a template for cutting subsequent pieces with expediency and efficiency by simply permitting the roller 30 to follow the shallow groove made initially in the template, as will be clearly apparent.

It is believed that the advantages and use of the invention will be clearly understood from the foregoing disclosure, and, accordingly, further description thereof at this point is deemed unnecessary.

While in the foregoing there has been shown and described the preferred embodiment of this invention it is to be understood that minor changes in the details of construction and arrangement of parts may be resorted to without departing from the spirit and scope of the invention as claimed.

Having described the invention, what is claimed as new is:

A work guiding attachment for band saws, comprising a pair of links pivotally connected together at one end thereof and having lugs mounted on their outer ends, the lug of one of said links being adapted to be secured to a blade guide of a band saw whereby the second link is swingable in a vertical plane, a spring having opposite ends thereof arcuated for substantially encircling the lugs in the outer ends of the respective links for urging said second link downwardly, and a work engaging roller provided with a sharp peripheral edge and rotatably mounted on the lug of said second link.

ARTHUR D. HOBBS.

REFERENCES CITED

The following references are of record in the file of this patent:

UNITED STATES PATENTS

| Number | Name | Date |
|---|---|---|
| 210,085 | Bowen et al. | Nov. 19, 1878 |
| 285,407 | Gretschel | Sept. 25, 1883 |
| 635,107 | Mershon | Oct. 17, 1899 |
| 666,898 | Graham | Jan. 29, 1901 |
| 1,037,583 | Benny | Sept. 3, 1912 |
| 1,264,332 | Przepiorka | Apr. 30, 1918 |
| 1,773,557 | Walrath | Aug. 19, 1930 |
| 2,129,618 | Horton | Sept. 6, 1938 |